United States Patent [19]

Carugati et al.

[11] Patent Number: 5,391,534
[45] Date of Patent: Feb. 21, 1995

[54] PROCESS FOR PRODUCING ACTIVATED CHARCOAL

[75] Inventors: Angelo Carugati, Manera; Gastone Del Piero, Milan; Riccardo Rausa, San Donato Milanese, all of Italy

[73] Assignee: Eniricerche S.p.A., Milan, Italy

[21] Appl. No.: 144,428

[22] Filed: Nov. 2, 1993

[30] Foreign Application Priority Data

Nov. 6, 1992 [IT] Italy .................... MI 92/A/002551

[51] Int. Cl.⁶ .................... C01B 31/12; B01J 20/20
[52] U.S. Cl. .................... 502/425; 502/426; 502/437
[58] Field of Search .................... 502/425, 426, 437

[56] References Cited

U.S. PATENT DOCUMENTS

| | | | |
|---|---|---|---|
| 1,621,195 | 3/1927 | Ernst et al. | 502/425 |
| 3,624,004 | 11/1971 | Wennerberg | 502/425 |
| 3,726,808 | 4/1973 | Wennerberg | 502/427 |
| 4,788,360 | 11/1988 | Calemma et al. | 44/608 |

FOREIGN PATENT DOCUMENTS

| | | |
|---|---|---|
| 486076 | 11/1929 | Germany . |
| 487026 | 11/1929 | Germany . |
| 1947277 | 7/1970 | Germany . |
| 4118342 | 12/1992 | Germany . |
| 393677 | 6/1933 | United Kingdom ............ 502/427 |

*Primary Examiner*—Paul E. Konopka
*Attorney, Agent, or Firm*—Oblon, Spivak, McClelland, Maier, & Neustadt

[57] ABSTRACT

A process for preparing activated charcoal having a high surface area is described, including a thermal treatment, in the presence of phosphoric acid, of regenerated humic acids.

12 Claims, No Drawings

PROCESS FOR PRODUCING ACTIVATED CHARCOAL

The present invention relates to a process for preparing activated charcoal by starting from regenerated humic acids, derived from coal oxidation, in the presence of phosphoric acid, and to the resulting activated charcoal.

Activated charcoal is a porous, microcrystalline carbonaceous material. The commercial products have a surface area which is generally comprised within the range of from 500 to 1500 $m^2/g$.

Activated charcoals may contain small amounts of oxygen and hydrogen which are chemically bonded as various functional groups, such as carbonyl, carboxy, phenolic, lactones and ether groups. Also mineral species can be contained, which are referred to as "ash" or "residue after combustion", up to a maximal level of 20% by weight.

The presence of very fine pores (micropores) in the activated charcoal confers a large internal surface area, which is the basis of the high adsorbing properties of this kind of products.

Nearly all carbonaceous materials from animal, vegetable or mineral origin can be used as raw materials for producing activated charcoal. However, owing to economical reasons, the main methods for preparing activated charcoals to be used in the liquid phase, start from lignites, coals, wood and paper processing residues as raw materials. Activated charcoals to be used for gas phase adsorption are produced, on the contrary, by starting from coconut shells, coal and petroleum residues.

Activated charcoals can be prepared by means of essentially two processes:
(a) chemical activation in the presence of activating substances which limit tar formation. The activating agent (e.g., $ZnCl_2$, $H_3PO_4$, KOH, $K_2S$, KCNS) performs the task of degradating or dehydrating the organic molecules during the charring or calcination step, and should be removed after process end, in order to liberate the porous structure;
(b) gaseous activation by means of combined-oxygen containing gases, such as steam and $CO_2$.

Among the processes belonging to the first group of processes, U.S. Pat. No. 3,642,657 discloses the production of activated charcoal by means of petroleum coke oxidation with nitric acid, decarboxylation of the resulting acidic coke, treatment with KOH, and activation with $CO_2$.

U.S. Pat. No. 3,726,808 discloses the production of activated charcoal via acidic coke preparation, its neutralization with KOH, salt pyrolysis and hydrolytic desulfuration of the pyrolysate, with steam.

U.S. Pat. No. 4,082,694 discloses an improved process for preparing activated charcoal from coke through controlled thermal steps.

European Patent Application EP-A-366,796 discloses a process for preparing activated charcoal from mesocarbon microbeads.

All these processes display several drawbacks; in particular, either they are very complex or, as disclosed in U.S. Pat. No. 4,082,694 and EP-A-366,796, they require that a large excess of activating agent, in particular potassium hydroxide, is used.

The present Applicant has found now, according to the present invention, that humic acids, derived from coal oxidation, constitute a suitable raw material for producing activated charcoal. In particular, the above said humic acids from coal are activatable, as a function of the surface area and of the pore volume of the end activated charcoal, with variable amounts of activating agent and at different temperatures, by means of a simplified and cheaper process than the processes known from the prior art.

In accordance therewith, a first aspect of the present invention relates to a process for producing activated charcoal by means of the activation of a carbonaceous substance and thermal treatment of said so activated carbonaceous substance, characterized in that:
(a) a carbonaceous substance selected from regenerated humic acids or mixtures thereof, derived from the oxidation of various kinds and grades of coal, is mixed with phosphoric acid;
(b) said mixture is submitted to a thermal treatment at a temperature comprised within the range of from 350° to 900° C.;
(c) the so produced activated charcoal is recovered by separation from the activating agent.

According to the preferred embodiment of the present invention, the activation temperature is comprised within the range of from 400° to 850° C.

The overall weight ratio of activating agent (on considering phosphoric acid at 100%) to the regenerated humic acids is comprised within the range of from 0.1:1 to 10:1, preferably of from 0.4:1 to 5:1.

The regenerated humic acids used in the present invention are products which are obtained by partial coal oxidation.

Such an oxidation, as known, can generally be carried out by using classic oxidizer agents ($O_2$, $KMnO_4$, $HNO_3$, and so forth). In particular, the oxidation with oxygen can be carried out both in aqueous slurry, as disclosed in ZA 88/4770, and under dry conditions, as reported in U.S. Pat. No. 4,788,360.

By the expression "regenerated humic acids", is meant that fraction of oxidized coal which is obtained by acidifying, with mineral acids, that fraction of oxidized coal which is soluble in aqueous solution of alkali-metal or ammonium hydroxides.

The chemical characteristics of the products as obtained, which are designated as "regenerated humic acids", are decidedly different from those displayed by their analogous products of natural origin—with which, however, they share their name, on the basis of a solubility criteria which is the only one which defines such a class of substances.

As known from published papers, the products obtained from coal oxidation are different from those of natural origin (e.g., as extracted from peats or lignites) essentially owing to a higher molecular weight, a higher aromatic character with a high level of oxygen-containing functional groups, mainly of phenolic and carboxylic character.

The humic acids used in the present invention are those which can be obtained by means of any processes of coal oxidation as described hereinabove.

According to the preferred embodiment, the regenerated humic acids of the present invention are produced by means of the process disclosed in U.S. Pat. No. 4,788,360. It consists in submitting coal to dry oxidation inside a fluidized bed reactor, with oxygen (or oxygen-nitrogen mixtures), at a temperature comprised within the range of from 150° to 300° C., and with a partial pressure of oxygen comprised within the range of from 1.1 to 10 atm. Potassium humates are obtained by submitting the reaction mixture to extraction with aqueous potassium hydroxide; humic acids can be obtained by acidifying the aqueous solution of said humates of potassium, or of any alkali metals or ammonium.

The mixture of regenerated humic acids and phosphoric acid can be prepared by mixing an aqueous solution, or dispersion, of humic acids with the desired amount of phosphoric acid, which may be either pure or diluted with water.

The concentration of phosphoric acid is not determining, in the sense that commercial phosphoric acids with various concentrations, or even polyphosphoric acid, can be used in a same way.

According to a preferred embodiment of the present invention, the resulting solution or dispersion is then dried, prior to the activation step. As an alternative, humic acids are dry-mixed with the activating agent in pure form.

The activation of humic acid is carried out under an inert atmosphere, e.g., under a nitrogen or argon atmosphere.

The activation is carried out by heating humic acids in the presence of the activating agent, at a temperature comprised within the range of from 350° to 900° C., preferably of from 400° to 850° C. and under an inert atmosphere (e.g., under an argon or nitrogen atmosphere, or in the presence of the vapours generated by pyrolysis).

The heating rate and the end heating time are not determining. However, the process can suitably be carried out with a heating rate comprised within the range of from 1° C./minute to 100° C./minute.

The mixture of humic acid and activating agent can be directly heated up to the end activation temperature, and can then be kept at that temperature during a stay time which is a function of the end temperature reached, and is indicatively comprised within the range of from 0.1 to 3 hours.

According to an alternative route, the activation can be carried out by stepwise heating, by heating the mixture up to one or more temperatures (obviously lower than the end temperature), keeping said heated mixture under isothermal conditions during a certain time period and then heating it up to the end desired temperature.

The resulting activated charcoal is then washed, after cooling, with water, or with aqueous basic solutions, in order to liberate the pores and remove or reduce the acidity, while simultaneously recovering the activating agent for a subsequent activation step.

The activated charcoal obtained as the end product has a surface area, as determined according to the B.E.T. method with nitrogen (nitrogen adsorption-desorption at 77° K.), comprised within the range of from 1000 to 3000 m²/g, is essentially constituted by micropores having a diameter which is prevailing shorter than 20 Angstroms, and has a poured density which, before compaction, is comprised within the range of from 0.05 to 0.5 g/cm³.

The several physical-chemical properties of the activated charcoals obviously are a function of various parameters, such as the humic acids used as the starting materials and the thermal treatment they were submitted to. The most important parameter seems however to be the activating agent/humic acid ratio.

The following experimental examples are reported in order to better illustrate the present invention.

EXAMPLE 1

Regenerated humic acids are used which are obtained from Sulcis coal oxidation, carried out according to the process disclosed in U.S. Pat. No. 4,788,360. In particular, the oxidation of Sulcis coal, ground down to a granulometry comprised within the range of from 200 to 600 microns, is carried out at 220° C. in air under a pressure of 6 bars gauge. The resulting oxidized coal is submitted to extraction with 2.1N KOH, with the ratio of oxidized coal:KOH (91%) being of 2.14. In that way, aqueous solutions of potassium humates are obtained. The regenerated humic acids are precipitated by acidification with mineral acids down to a pH value of 2, then are filtered and dried.

Pristine Sulcis coal has the following characteristics:
Ash (% by weight, dry basis): 14.1
Elemental analysis (% by weight, d.a.f.)
Carbon 70.35
Hydrogen 5.01
Nitrogen 1.74
Sulfur 8.94
Oxygen 13.96
H:C 0.85
O:C 0.15

The regenerated humic acids obtained from Sulcis coal display the following characteristics:
Ash (% by weight, dry basis): 3.3
Elemental analysis (% by weight, d.a.f.)
Carbon 64.35
Hydrogen 3.27
Nitrogen 1.99
Sulfur 3.60
Oxygen 26.78
H:C 0.61
O:C 0.32

The so obtained regenerated humic acids are mixed with a solution of phosphoric acid at 85%, so as to have available two samples with a weight ratio of phosphoric acid:humic acids of 1:1 (Example 1) and 3:1 (Example 2). The mixtures are dried (80° C. under vacuum) and then are submitted to thermal treatment inside a Heraeus tubular furnace (ROF 7/50) at atmospheric pressure, under a nitrogen flow, according to the following heating schedule: heating rate 5° C./minute, two intermediate steps at 110° and 385° C., respectively, with stay times of 1 hour each, and subsequent stay at end temperature for 2 hours. Both samples are in fact tested at two different end temperatures, i.e., 600° and 850° C.

At the end of the thermal treatment, the activating agent is removed by washing.

The results of the above tests are reported in following Table 1.

TABLE 1

| $H_3PO_4/AU$ | End Temp. = 600° C. | | End Temp. = 600° C. | |
|---|---|---|---|---|
| | Surface Area (m²/g) | Pore Volume (cm³/g) | Surface Area (m²/g) | Pore Volume (cm³/g) |
| 1:1 | 1777 | 1.011 | 1236 | 0.764 |
| 3:1 | 2453 | 1.371 | 1132 | 0.625 |

The data reported in Table 1, in which "surface area" and "pore volume" indicate the surface area per weight unit and the specific pore volume of the product obtained, show that both thermal treatments are effective to produce activated charcoal with a high surface area, even if the thermal treatment with an end temperature of 600° C., may be preferable.

EXAMPLES 3-4

Example 3 uses once more the same regenerated humic acids deriving from Sulcis coal of Examples 1 and 2, whilst Example 4 uses humic acids deriving from Montana Rosebud coal, obtained according to the same technique as reported in Examples 1 and 2. Table 2 reports the composition of Montana Rosebud coal and of the humic acids obtained from it.

TABLE 2

|  | Montana Rosebud Coal | Humic acids from Montana Rosebud Coal |
|---|---|---|
| Ash (% by weight, dry basis) | 8.4 | 7.6 |
| Elemental analysis (% by weight, d.a.f.) | | |
| C | 74.13 | 66.94 |
| H | 5.25 | 4.09 |
| N | 1.30 | 1.37 |
| S | 0.76 | 0.50 |
| O | 18.56 | 27.10 |
| H:C | 0.82 | 0.73 |
| O:C | 0.33 | 0.30 |

Apart from the different humic acids, Examples 3 and 4 are carried out under the same identical experimental conditions. The regenerated humic acids are mixed with phosphoric acid in a ratio, by weight, of 1:1, are dried by means of a microwave oven under an inert atmosphere, are brought up to the temperature of 600° C. with a heating rate of 5° C./minute, and are kept at that temperature for 2 hours. The results are reported in Table 4. In this Table also the results are reported for comparison purposes, which were obtained by activating in the same way (i.e., with a same ratio of phosphoric acid and same thermal treatment), pristine Sulcis coal (comparison Example No. 1), oxidized Sulcis coal (comparison Example No. 2), pristine Montana Rosebud Coal (comparison Example No. 3), and commercial humic acids from natural origin (comparison Example No. 4). The compositions of oxidized Sulcis Coal and commercial humic acids from natural origin are reported in following Table 3.

TABLE 3

|  | Oxidized Sulcis Coal | Natural Humic Acids |
|---|---|---|
| Ash (% by weight, dry basis) | 13.7 | 9.3 |
| Elemental analysis (% by weight, d.a.f.) | | |
| C | 67.57 | 62.47 |
| H | 3.11 | 4.28 |
| N | 1.90 | 3.38 |
| S | 8.84 | 3.42 |
| O | 18.58 | 27.45 |
| H:C | 0.55 | 0.82 |
| O:C | 0.21 | 0.33 |

Table 4 displays the characteristics of activated charcoals obtained from the substrates according to the present invention; for comparison purposes, also the results are reported which were obtained by starting from different substrates,

TABLE 4

| Example | Surface Area ($m^2/g$) | Specific Pore Volume ($cm^3/g$) |
|---|---|---|
| Example No. 3 | 1522 | 0.757 |
| Example No. 4 | 1513 | 0.799 |
| Comparison Ex. No. 1 | 220 | 0.255 |
| Comparison Ex. No. 2 | 365 | 0.259 |
| Comparison Ex. No. 3 | 542 | 0.322 |
| Comparison Ex. No. 4 | 485 | 0.362 |

The results displayed in table 4 show that only humic acids deriving from coal are suitable substrates for producing activated charcoal having good surface area and pore volume characteristics.

EXAMPLES 5-9

These tests are carried out by heating at different end temperatures, with a heating rate of 5° C./minute, a mixture of phosphoric acid and Sulcis humic acids in the ratio of 1:1 by weight; the above said mixtures are then kept at the end temperature for a 2 hour period. The results are reported in Table 5.

TABLE 5

| Example | End Temp. (°C.) | Surface Area ($m^2/g$) | Specific Pore Volume ($cm^3/g$) |
|---|---|---|---|
| 5 | 700 | 1459 | 0.743 |
| 6 | 600 | 1522 | 0.757 |
| 7 | 500 | 1677 | 0.901 |
| 8 | 450 | 1798 | 0.923 |
| 9 | 400 | 1458 | 0.763 |

The results displayed in Table 5 demonstrate that all tested temperatures are effective in order to yield activated charcoal endowed with good characteristics. It should be however observed that temperatures of approximately 450°-500° C. yield activated charcoal with slightly better characteristics.

EXAMPLES 10-14

These tests are carried under the same conditions as illustrated in Examples 5-9, with the only difference that the starting material is regenerated humic acid derived from Montana Rosebud Coal in lieu of Sulcis Coal. The results are reported in Table 6.

TABLE 6

| Example | End Temp. (°C.) | Surface Area ($m^2/g$) | Specific Pore Volume ($cm^3/g$) |
|---|---|---|---|
| 10 | 700 | 1431 | 0.780 |
| 11 | 600 | 1513 | 0.799 |
| 12 | 500 | 1758 | 0.961 |
| 13 | 450 | 1738 | 0.918 |
| 14 | 400 | 1488 | 0.819 |

The results obtained with these humic acids are very similar to those obtained with Sulcis humic acids.

EXAMPLES 15-16

These tests are carried under the same conditions as illustrated in Examples 5-14, at the end temperature of 450° C., with the difference that the ratio, by weight, of phosphoric acid to humic acids is of 3:1.

Example 15 is carried with regenerated humic acid derived from Sulcis Coal, whilst Example 16 is carried out with humic acids from Montana Rosebud Coal.

The results are reported in Table 7.

TABLE 7

| Example | Origin of Humic Acids | Surface Area (m²/g) | Specific Pore Volume (cm³/g) |
| --- | --- | --- | --- |
| 15 | Sulcis | 2113 | 1.270 |
| 16 | Montana Rosebud | 1947 | 1.056 |

We claim:

1. A process for producing activated charcoal comprising:
   (a) mixing a carbonaceous substance selected from regenerated humic acids, derived from acidifying, with mineral acids, a fraction of oxidized coal which had been solubilized in an aqueous solution of alkali metal or ammonium hydroxides, with phosphoric acid to produce a mixture;
   (b) thermally treating said mixture at a temperature of from 350° to 900° C.;
   (c) recovering the so produced activated charcoal.

2. The process according to claim 1, wherein the step of thermally treating said mixture is carried out at a temperature of from 400° to 850° C.

3. Process according to claim 1, in which the ratio, by weight, of phosphoric acid to humic acids is comprised within the range of from 0.1:1 to 10:1.

4. Process according to claim 3, in which the ratio, by weight, of phosphoric acid to humic acids is comprised within the range of from 0.4:1 to 5:1.

5. The process according to claim 1, wherein the step of thermally treating said mixture occurs under an inert atmosphere.

6. The process according to claim 2, wherein the step of thermally treating said mixture occurs under an inert atmosphere.

7. The process according to claim 1, wherein the step of thermally treating said mixture further comprises a heating rate of from 1° to 100° C./minute.

8. The process according to claim 2, wherein the step of thermally treating said mixture further comprises a heating rate of from 1° to 100° C./minute.

9. The process according to claim 1, wherein the step of thermally treating said mixture further includes treatment at a final temperature which is maintained for a period of from 0.1 to 3 hours.

10. The process according to claim 2, wherein the step of thermally treating said mixture further includes treatment at a final temperature which is maintained for a period of from 0.1 to 3 hours.

11. The process according to claim 1, further comprising washing said activated charcoal with water.

12. The process according to claim 1, further comprising washing said activated charcoal with an aqueous basic solution.

* * * * *